(12) United States Patent
Shike et al.

(10) Patent No.: US 7,392,209 B2
(45) Date of Patent: Jun. 24, 2008

(54) SYSTEM FOR MANAGING OR NOTIFYING THE RESULTS OF COMMUNICATION WITH A CUSTOMER

(75) Inventors: Chikashi Shike, Fukushima (JP); Noriaki Abe, Tokyo (JP)

(73) Assignees: Bigrental Co., Ltd., Fukushima (JP); Komatsu Ltd., Tokyo (JP)

( * ) Notice: Subject to any disclaimer, the term of this patent is extended or adjusted under 35 U.S.C. 154(b) by 886 days.

(21) Appl. No.: 10/342,226

(22) Filed: Jan. 15, 2003

(65) Prior Publication Data

US 2003/0135602 A1    Jul. 17, 2003

(30) Foreign Application Priority Data

Jan. 16, 2002  (JP)  ............... 2002-007526

(51) Int. Cl.
*G06F 17/30* (2006.01)
(52) U.S. Cl. ....................................................... 705/27
(58) Field of Classification Search ................ 705/1, 705/5, 27
See application file for complete search history.

(56) References Cited

U.S. PATENT DOCUMENTS

| | | | | |
|---|---|---|---|---|
| 5,892,905 | A | * | 4/1999 | Brandt et al. ................. 726/11 |
| 5,922,040 | A | * | 7/1999 | Prabhakaran ................ 701/117 |
| 6,131,164 | A | * | 10/2000 | Parker ............................. 726/5 |
| 2002/0099575 | A1 | * | 7/2002 | Hubbard et al. ............... 705/5 |
| 2002/0161786 | A1 | * | 10/2002 | Mangan et al. ............. 707/200 |

FOREIGN PATENT DOCUMENTS

| | | |
|---|---|---|
| JP | 5-233653 | 9/1993 |
| JP | 2000-113261 | 4/2000 |
| JP | 2000-194894 | 7/2000 |
| JP | 2000-339581 | 12/2000 |
| JP | 2001-283104 A | 10/2001 |

OTHER PUBLICATIONS

Nikkei Information Strategy dated Mar. 2001 pp. 53-60.

\* cited by examiner

*Primary Examiner*—Andrew Caldwell
*Assistant Examiner*—Grant Ford
(74) *Attorney, Agent, or Firm*—Westerman, Hattori, Daniels & Adrian, LLP.

(57) ABSTRACT

A rental company system 100 comprises a branch master table 124 for unitarily registering and managing the content of inquiries made at each branch office. In response to an operation performed by a branch operator, a branch terminal 112 in each branch office displays a "reception registration and modification" screen 907 and receives input of a plurality of types of inquiry content information. The branch terminal 112 registers the inputted inquiry content information in the branch master table 124 via an internal network 110. In response to an operation performed by a branch operator, the branch terminal 112 displays an "inquiry content information transfer" screen 980 and transfers the inquiry content information inputted into the "reception registration and modification" screen 907 to a portable telephone 801 of a transmission receiving party inputted into the aforementioned screen 980.

2 Claims, 12 Drawing Sheets

GENERAL VIEW OF WORK/SYSTEM FLOW
(MAINTENANCE/SERVICE)

FIG. 8

904 — MACHINE CONDITIONS INQUIRY

SECURITY PROCESSING 2001/06/19 20:46
DATE [ ]
AVAILABILITY CODE [ ▼]
MACHINE CODE [ ][ ]
MANAGEMENT NO. [ ]

AVAILABILITY SYMBOLS
● AVAILABLE
▲ RESERVED
△ TENTATIVELY RESERVED
★ UNDER REPAIR
✕ ON DISPATCH
RED: RESTRICTED

905 — [CANCEL]

| AVAILABILITY | MANAGEMENT NUMBER - MODEL - SERIAL NUMBER - SPECIFICATIONS - RESERVATION - REQUESTS | HOUR METER RESET DATE | WAREHOUSE AREA DISPATCH POINT |
|---|---|---|---|
| ✕ | PS0443 - PC120 - 61608 RUBBER(R/L)/TMS SPEC. | 3047 2001/03/30 | KOHRIYAMA |
| ★ | PS0140 - PC120 - 101172 IRON 700/PIPING/TMS SPEC. | 3047 2001/04/30 | SHIRAKAWA |
| ● | PS1052 - PC120 - 62098 RUBBER(P)/TMS SPEC./ ARM FORTIFICATION | 1923 2001/06/06 | AIZU |
| ● | PS0458 - PC - 61663 RUBBER(R/L)/TMS SPEC. | 2072 2001/06/17 | AIZU |
| ● | PS0486 - PC120 - 61701 IRON 500/TMS SPEC./ ARM FORTIFICATION | 1597 2001/06/18 | AIZU |
| ● | PS0548 - PC120 - 61854 IRON 600/TMS SPEC. | 1923 2001/06/17 | AIZU |
| ● | PS1326 - PC120 - 63151 RUBBER(P)500/TMS SPEC. | 1179 2001/06/17 | AIZU |
| ⋮ | ⋮ | ⋮ | ⋮ |

FIG. 9

MACHINE CONDITIONS INQUIRY

SECURITY PROCESSING 2001/06/19 20:46

DATE
AVAILABILITY CODE ▶
MACHINE CODE
MANAGEMENT NO.

AVAILABILITY SYMBOLS
● AVAILABLE
◀ RESERVED
△ TENTATIVELY RESERVED
★ UNDER REPAIR
✕ ON DISPATCH
RED: RESTRICTED

[CANCEL]

| AVAILABILITY | MANAGEMENT NUMBER - MODEL - SERIAL NUMBER - SPECIFICATIONS - RESERVATION - REQUESTS | HOUR METER RESET DATE | WAREHOUSE AREA DISPATCH POINT | PROVISIONAL DISPATCH DATE | PROVISIONAL RETURN DATE |
|---|---|---|---|---|---|
| ✕ | PS0140 - PC120 - 101172 IRON 700/PIPING/TMS SPEC. | 3047 2001/03/30 | KOHRIYAMA | 2001/03/14 | 2001/05/14 |
| ★ | PS0140 - PC120 - 101172 IRON 700/PIPING/TMS SPEC. | 3047 2001/04/30 | SHIRAKAWA | 2001/03/19 | 2001/05/15 |
| ● | PS1052 - PC120 - 62098 RUBBER(P)/TMS SPEC./ ARM FORTIFICATION | 1923 2001/06/19 | AIZU | 2001/06/10 | 2001/07/15 |
| ... | ... | ... | ... | ... | ... |
| ... | ... | ... | ... | ... | ... |

906 — INQUIRY LIST

| BRANCH NAME | REPRESENTATIVE | CUSTOMER CODE | CUSTOMER NAME | MACHINE CODE | ORDER CONTENT | ORDERING MEANS | AVAILABILITY INQUIRY | PRICE INQUIRY | SPECIFICATION INQUIRY |
|---|---|---|---|---|---|---|---|---|---|
| SUKAGAWA | AKIO SAKAI | 00082607 | KK LTD. | AF200 | NEW ORDER | SALES | | | |
| HARAMACHI | T.FUSIMI | 00051165 | TT LTD. | PC120 | | TELEPHONE | RESPONSE AT OTHER BRANCH | | |
| SUKAGAWA | K.KAMIISHI | 00083158 | TM LTD. | D60P | CONDITIONAL CONTACT | SALES | RESPONSE AT THIS BRANCH | | |
| SOMA | H.YASUZUKI | 00051962 | MN LTD. | JV40 | FOLLOW-UP NECESSARY | SALES | | RESERVED DISCOUNT AGREEMENT | |
| SOMA | H.YASUZUKI | 00051962 | MN LTD. | JW200 | FOLLOW-UP NECESSARY | SALES | | | |
| SOMA | H.YASUZUKI | 00051962 | MN LTD. | JM120 | NEW ORDER | SALES | ORDER RECEIVED | DISCOUNT AGREEMENT | |
| YASUHARA | M.KASHIMURA | 00040061 | dondon | PC120 | | TELEPHONE | | | |
| YASUHARA | M.KASHIMURA | 00042828 | KK LTD. | PC120 | | | DOUBLE RENTAL | | |
| SHIRAKAWA | K.SATO | 00062677 | FF LTD. | PC120 | AWAITING CONFIRMATION OF DETAILS | SALES | | | |
| SHIRAKAWA | K.SATO | 00042677 | N LTD. | PC120 | NEW ORDER | PORTABLE TELEPHONE | ORDER RECEIVED | | |
| HANIWA | A.YAMAUCHI | 00082809 | S.MAEKAWA | PC120 | NEW ORDER | BRANCH VISIT | ORDER RECEIVED | CLEARED BY HEAD OFFICE | |
| HANIWA | A.YAMAUCHI | 00065309 | KEN LTD. | PC120 | CONTACT FOR CONFIRMATION OF DETAILS | TELEPHONE | | | |

FIG. 11

RECEPTION REGISTRATION & MODIFICATION — 907

| CUSTOMER CODE | CUSTOMER NAME |
|---|---|
| 00082607 | SHINOGI GROUP LTD. | SEARCH | SHIKE CHIKASHI |

RECEPTION DATE: 2001/06/19  20:39  CONTINUED FROM PREVIOUS TIME

RECEPTION: SALES ▶

MACHINE CODE: AF200   SKILL   SPECIFICATION

☑ ATTACHMENTS YES/NO

INQUIRY DETAILS
- AVAILABILITY INQUIRY: AVAILABLE AT OTHER BRANCH ▶ — 908
- PRICE INQUIRY: QUOTE, AGREEMENT ▶ — 909
- SPECIFICATION INQUIRY: EXPLAINED ▶ — 910

OTHER

ORDER: ORDER RECEIVED ▶ — 911
NEW ORDER ▶

912 REMARKS

REGISTER   CLEAR   RECEPTION LIST   ENTER   RETURN 914    913

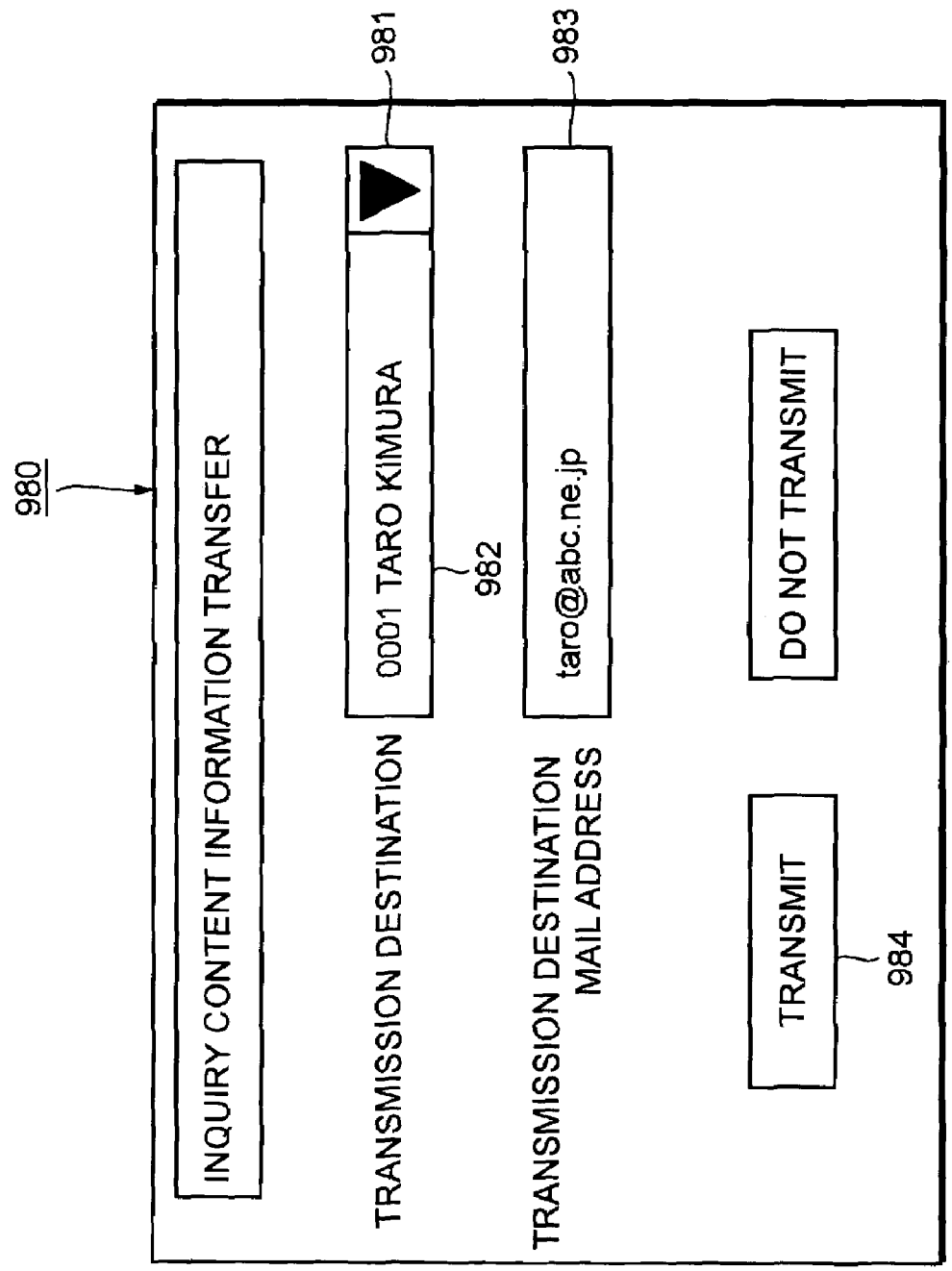

SYSTEM FOR MANAGING OR NOTIFYING THE RESULTS OF COMMUNICATION WITH A CUSTOMER

BACKGROUND OF THE INVENTION

1. Field of the Invention

The present invention relates to technology for managing or notifying the results of communication with a customer, and is applicable in a rental enterprise in which construction vehicles are loaned, for example, as a device or the like for supporting the management or notification to a responsible party of the results of communication with a customer conducted over a telephone line.

2. Description of the Related Art

Explanation will be provided below using a construction vehicle rental company as an example.

This company employs a business model in which a plurality of branch offices are distributed in different locations and each branch office possesses and operates a plurality of construction vehicles independently. Thus, inquiries concerning the availability of the construction vehicles or the like usually tend to be made to each of the branch offices by telephone. The person responsible usually deals with the inquiry, but when the person responsible is outside of the office, the person who accepts the inquiry takes a note of the content of the inquiry and informs the person responsible of the content of the noted inquiry by telephone or the like, whereupon the person responsible deals with the inquiry by calling the source of the inquiry.

In the aforementioned conventional system, however, if a telephone call containing an inquiry, a reservation or the like is placed from a customer when the sales representative who is responsible for this customer is out of the office, it is difficult to share this information with the sales representative instantly (or in other words, the sales representative is not always informed of the content of the inquiry in a timely fashion). Moreover, the content of the inquiry is not always conveyed accurately. It is therefore sometimes impossible to respond to the customer in a precise and timely fashion. For the customer, this is of course a problem which requires improvement, and since business deals maybe lost as a result, this is also a problem that the rental company would wish to see redressed.

Further, since representatives deal with inquiries individually in this conventional system, the content of the inquiries placed at each branch office are presumably not managed on a computer. If the content of inquiries placed at each of the branch offices were to be managed on a computer, the rental company as a whole would be able to learn such information as the construction vehicle for which the most inquiries were placed, and as a result business efficiency could be improved.

Also in the aforementioned conventional system, a typical customer/representative system is employed, and according to this system the results of communication are rarely learned by persons other than the responsible sales representative. Thus, even if a call center is created to deal with inquiries and reservations made in the evening and on holidays, the running thereof is difficult. For example, if a call is placed from a customer to the call center or the front desk of an outlet and a person other than the representative is informed that "I wish to rent the item I asked the price of yesterday", there is no way to respond.

As noted above, in the aforementioned conventional system persons other than the responsible sales representative basically never learn the results of communication, and therefore an executive officer is unable to learn information such as a refusal due to lack of availability. As a result, business efficiency deteriorates.

These problems are not limited only to rental enterprises, and similar problems are likely to exist in various other business fields in which communication is conducted with customers.

SUMMARY OF THE INVENTION

It is therefore an object of the present invention to enable the results of communication with a customer to be notified in a precise and timely fashion to a desired or predetermined person.

It is another object of the present invention to enable the results of communication with a customer to be managed on a computer.

A system according to a first aspect of the present invention is a system for managing the results of communication with a customer, comprising means for displaying a communication results input screen (907) for inputting the results of communication with a customer and information relating to the customer, means for storing the customer information and communication results inputted into the communication results input screen (907), and means for displaying a communication results list screen (906) which displays the stored customer information and communication results as a list divided into a plurality of items.

In a preferred embodiment, means for displaying a communication support screen (904) for supporting the communication with the customer together with the communication results input screen (907), and means for executing processing requested by an operator via the communication support screen (904) are further comprised.

In a preferred embodiment, a plurality of remotely disposed computer terminals are comprised, this plurality of terminal computers being constructed so as to be able to display the communication results input screen (907), and the aforementioned storing means unitarily store the communication results and customer information respectively inputted into the communication results input screen (907) which is displayed on the plurality of computer terminals.

The system according to a second aspect of the present invention is a system for notifying a desired or predetermined receiving party of the results of communication with a customer, comprising means for displaying a communication results input screen (907) for inputting the results of communication with a customer and information relating to the customer, means for receiving a transfer request from an operator regarding the customer information and communication results inputted into the communication results input screen (907), and means for notifying, in accordance with the transfer request, a predetermined receiving party or a receiving party designated by the operator (more specifically, a party designated on a screen (980) for designating a desired receiving party, for example) of the customer information and communication results (for example information concerning a customer selected by the operator and the results of the communication there with) inputted into the communication results input screen (907).

The means in the system of the present invention may all be held on one computer, or may be divided among a plurality of computers connected to a communications network.

BRIEF DESCRIPTION OF THE DRAWINGS

FIG. 8 is a view showing an example of a "Machine Status Inquiry" screen;

FIG. 9 is a view of the "Machine Status Inquiry" screen displaying a larger amount of types of information;

FIG. 10 is a view showing an example of an "Inquiry List" screen;

FIG. 11 is a view showing an example of a "Reception Registration and Modification" screen; and FIG. 12 is a view showing an example of an "Inquiry Content Information Transfer" screen.

DESCRIPTION OF THE PREFERRED EMBODIMENTS

First, a rental system to which the management system according to an embodiment of the present invention is applied will be explained in its entirety with reference to FIGS. 1 through 5. Then, the parts thereof in this embodiment which relate directly to the present invention will be explained with reference to FIG. 6 onward.

Figure 1:
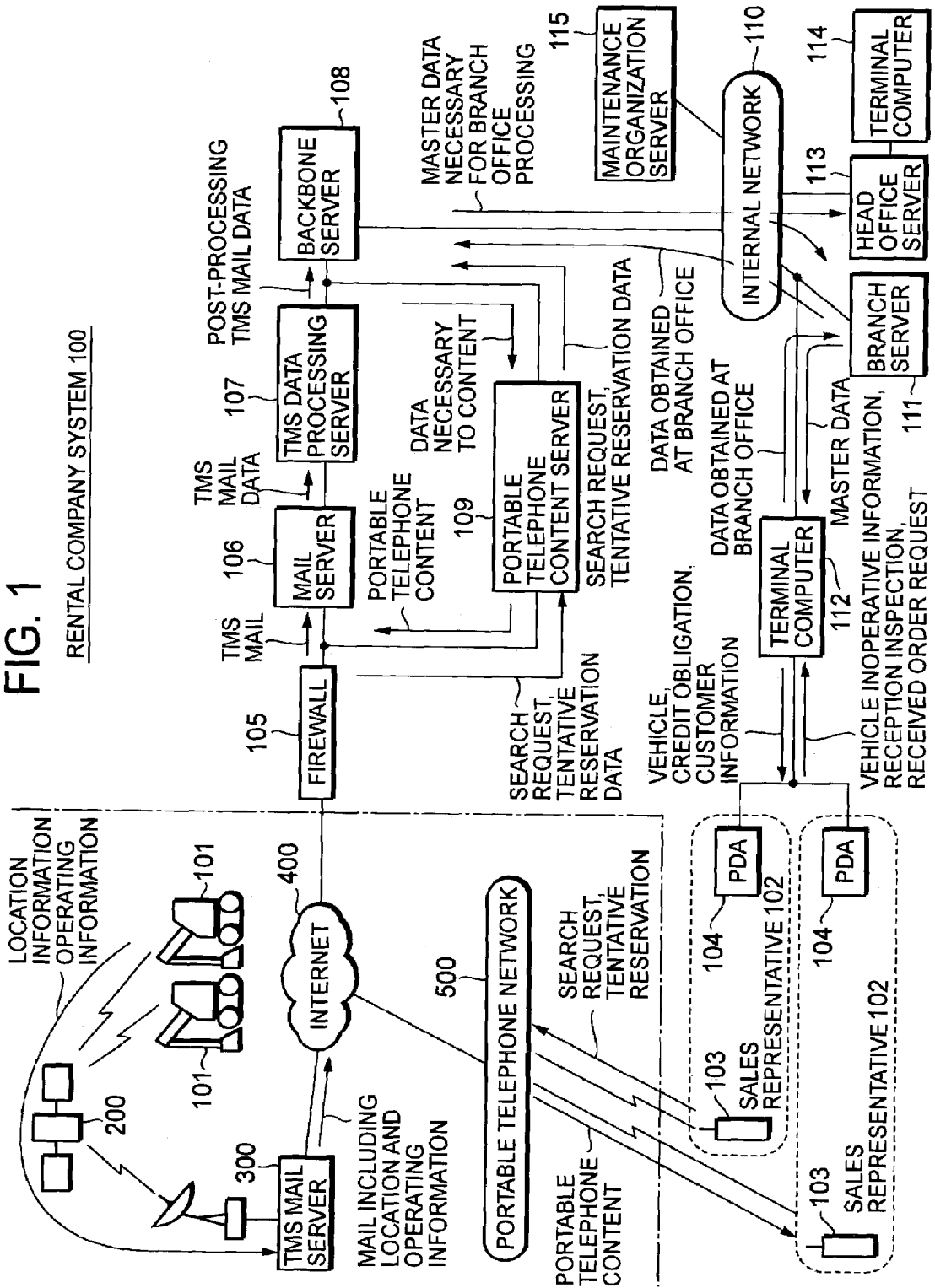
FIG. 1 is a block diagram illustrating a rental system to which the information providing system according to an embodiment of the present invention has been applied.

FIG. 1 shows the overall constitution of a rental system to which the management system according to an embodiment of the present invention is applied.

This system comprises a computer system for conducting information processing inside a rental company (to be referred to hereafter as "rental company system") 100, a large number of construction vehicles 101, 101 . . . which are products for rent, and a TMS (Tele-Management System) mail server 300 which remotely detects the position, operating conditions and so on of the construction vehicles 101, 101 . . . .

The construction vehicles 101, 101 . . . and the TMS mail server 300 are designed to be able to communicate through an extremely wide range mobile wireless communications system (which may include a portable telephone network) such as a satellite communications system 200, for example, regardless in principle of the time, or the location of the construction vehicles 101, 101 . . . . Each of the construction vehicles 101, 101 . . . are equipped with a GPS device and various sensors for detecting the state of various parts inside the vehicle and thus the TMS mail server 300 maybe informed of the current position of the vehicle detected by the GPS device and operating information detected by the various sensors (operating time, content of breakdowns/irregularities, engine oil pressure, engine rotation speed, working machinery oil temperature, working machinery oil pressure, radiator water temperature, working machinery load, amount of fuel remaining etc.) at any time through the satellite communications system 200.

The TMS mail server 300 and the rental company system 100 are designed to be able to communicate at any time through an inter-computer communications network such as the Internet 400, for example. The TMS mail server 300 gathers the latest information concerning the position and operational state of the construction vehicles 101, 101 . . . , and notifies the rental company system 100 of this information as required or periodically by electronic mail, for example.

The rental company system 100 comprises various computers 105 to 112 which are installed inside the company building, and portable information processing terminals, for example portable telephones 103, 103 . . . and PDA (Personal Digital Assistants) 104, 104 . . . carried respectively by sales representatives 102, 102 . . . . Note that the system constitution in the drawing is only an example, and that other constitutions may of course be employed. For example, each sales representative 102 carries two devices, a portable telephone 103 and a PDA 104, due to the fact that at the time of this application the portable telephone 103 is inadequate in terms of information processing and a display function and the PDA 104 is inadequate in terms of a communication function. If a portable terminal which is of sufficiently high caliber in both functions becomes usable in the future, then this one device alone will be sufficient.

Inside a firewall 105 of the rental company system 100, a mail server 106 receives and stores electronic mails (to be referred to hereafter as "TMS mails") sent from the TMS mail server 300 containing the latest information as to the position and operating state of the construction vehicles 101, 101 . . . . A TMS data processing server 107 receives the TMS mails stored in the mail server 106, extracts the data indicating the latest information as to the position and operating state of the construction vehicles 101, 101 . . . (to be referred to hereafter as "TMS data") from these electronic mails, and sends this TMS data to a backbone server 108.

The backbone server 108 has a database in which all data necessary to the rental company system 100 is stored. The data stored in this database (to be referred to hereafter as "master data") will be decsribed in detail herein below. Having received the TMS data, the backbone server 108 uses the data to update the master data relating to information concerning the position and operating state of the construction vehicles 101, 101 . . . . The backbone server 108 is connected via an internal network to branch servers 111, 111 . . . which are distributed in each of the large number of branch offices owned by the rental company, and transmits master data necessary for the work of the respective branch offices to the branch servers 111, 111 . . . periodically or as required. The backbone server 108 is also connected via the internal network to a head office server 113 which is disposed in the head office of the rental company, and transmits master data necessary for the work of the head office to the head office server 113 periodically or as required. Details of the work of the branch offices and the head office will be described herein below.

A portable telephone content server 109 is connected to the backbone server 108. The portable telephone content server 109 is capable of communicating via the Internet 400, for example, with a Web browser on the portable telephones 103, 103 . . . carried by the sales representatives 102, 102 . . . , whereby various data can be transmitted to the Web browsers of these portable telephones 103, 103 . . . as portable telephone content in a predetermined format, predetermined data can be received from these Web browsers, and so on.

The types of data which can be provided to the portable telephones 103, 103 . . . as portable telephone content include, for example, rental availability or reservations for the construction vehicles, the leasing record of each customer, the operating ratio of each construction vehicle, the status of each rental agreement, the state of vehicles on loan, and so on. The portable telephone content server 109 first receives a search request for a specific piece of portable telephone content from the portable telephone 103 of a sales representative 102 and then sends a search request to the backbone server 108 for the latest master data necessary for the requested portable telephone content. The data resulting from the search is then received from the backbone server 108, whereupon the requested portable telephone content is created on the basis of these latest data. This portable telephone content is then transmitted to and displayed on the portable telephone 103 of the sales representative 102.

The data which are received by the portable telephone content server 109 from the portable telephone 103 of each sales representative 102 include tentative rental reservation data relating to a specific construction vehicle. Upon reception of these tentative reservation data, the portable telephone content server 109 sends the data to the backbone server 108.

The branch server 111 in each branch office of the rental company stores the latest master data downloaded from the backbone server 108, and a branch office work application for conducting branch office work is installed in each of several terminal computers 112, 112 . . . to which this branch server 111 is connected. The branch office work application downloads the necessary master data from the branch server 111 to the terminal computers 112 such that work processing is conducted while accessing these data. The details of this work processing will be described herein below.

The PDAs 104, 104 . . . carried by each of the sales representatives 102, 102 . . . may also be connected to the terminal computers 112 of a branch office as required. A PDA work application for supporting work at the site of the sales representative 102 is installed in each PDA 104. When the PDA 104 is connected to the terminal computers 112, the PDA work application downloads predetermined types of data such as vehicle information credit obligation information, customer information and so on from the terminal computers 112, and uploads data inputted into the PDA 104 in accordance with the activities of the sales representative 102 such as information concerning inoperative vehicles, reception inspection information, information concerning an order inquiry, and so on to the terminal computers 112. For example, the sales representatives 102, 102 . . . connect their PDAs 104, 104 . . . to the terminal computers 112 at the start of each working day to download the latest information from the terminal computers 112. Then, at the end of each working day, each PDA 104, 104 . . . is connected to the terminal computers 112 to upload sales data inputted during that day to the terminal computers 112.

The data which have to be reflected in the master data in the backbone server 108 from the data inputted into the terminal computers 112 (data inputted in the work processing of the branch office work application or data uploaded from the PDAs 104, 104 . . . ) are uploaded to the backbone server 108 via the branch server 111 periodically or as required, and the master data in the backbone server 108 are updated on the basis of these data.

In the head office of the company, several terminal computers 114 are connected to the head office server 113. A head office work application installed in the terminal computers 114 is used to conduct work processing at head office. The data which have to be reflected in the master data in the backbone server 108 from among the data inputted into the terminal computers 114 during head office work processing are uploaded to the backbone server 108 via the head office server 113 periodically or as required, and the master data in the backbone server 108 are updated on the basis of these data.

The rental company system 100 is also connected to a server 115 of an external maintenance organization which performs comparatively large scale maintenance and the like such as specific self-imposed construction vehicle tests or comparatively large scale repairs.

According to the rental system having a constitution as that described above, information concerning all of the construction vehicles 101, 101 . . . possessed by the rental company (for example current location, operating information, rental availability or reservation status, maintenance record etc.) is managed unitarily on the backbone server 108 in the rental company system 100, and this information is constantly updated to its latest version. This information can be referenced from the terminal computers 112 of any branch office or from the PDA 104 or portable telephone 103 of any sales representative 103, and business activities can be implemented on the basis thereof.

As a result, all of the construction vehicles 101, 101 . . . can be operated efficiently. This is because the barriers between branch offices that exist in conventional business models are eliminated, and thus all of the sales representatives are able to conduct business concerning all of the construction vehicles located in all of the branch offices. Moreover, it is possible to select and receive an order for the vehicle from among all of the construction vehicles which is most favorable from the points of view of dispatch and suitability to the request of the customer (for example the current location, operating conditions, and rental status).

Also according to the system of this embodiment, a sales representative is able to respond swiftly to the needs of a customer. This is because, as explained above, the vehicle which is most favorable from the points of view of suitability to the request of the customer and dispatch can be selected from among all of the vehicles, and also because the current condition of the vehicles can be checked by PDA or portable telephone at any time and from any location. Thus, if an appropriate vehicle is found, a tentative reservation may be placed by portable telephone.

Also according to the system of this embodiment, maintenance of vehicles on loan can be conducted appropriately. This is because the current location and operating conditions of even vehicles on loan can be learned through TMS data, and therefore independent judgments can be made on the rental company side on the basis of the TMS data as to the necessity for maintenance or the materials and manpower necessary for the maintenance, whereupon appropriate manpower can be dispatched to the operating site. In the case of construction machinery, operations are often performed in remote mountainous areas, and therefore this point has significant benefits.

It is also possible according to the system of this embodiment to ensure a constant level of quality in vehicles which are placed on the used vehicle market by controlling the quality of the construction vehicles. This is because the condition (for example the current location, operating conditions, rental availability or reservation status, maintenance record etc.) of all of the construction vehicles is known, and therefore maintenance schedules can be compiled on the basis of this information so that all vehicles receive appropriate maintenance, and rental schedules can be adjusted appropriately so that hour meters (the total amount of operating time) are at appropriate values when a vehicle is placed on the used vehicle market.

The rental company system 100 will now be described in detail.

Figure 2:
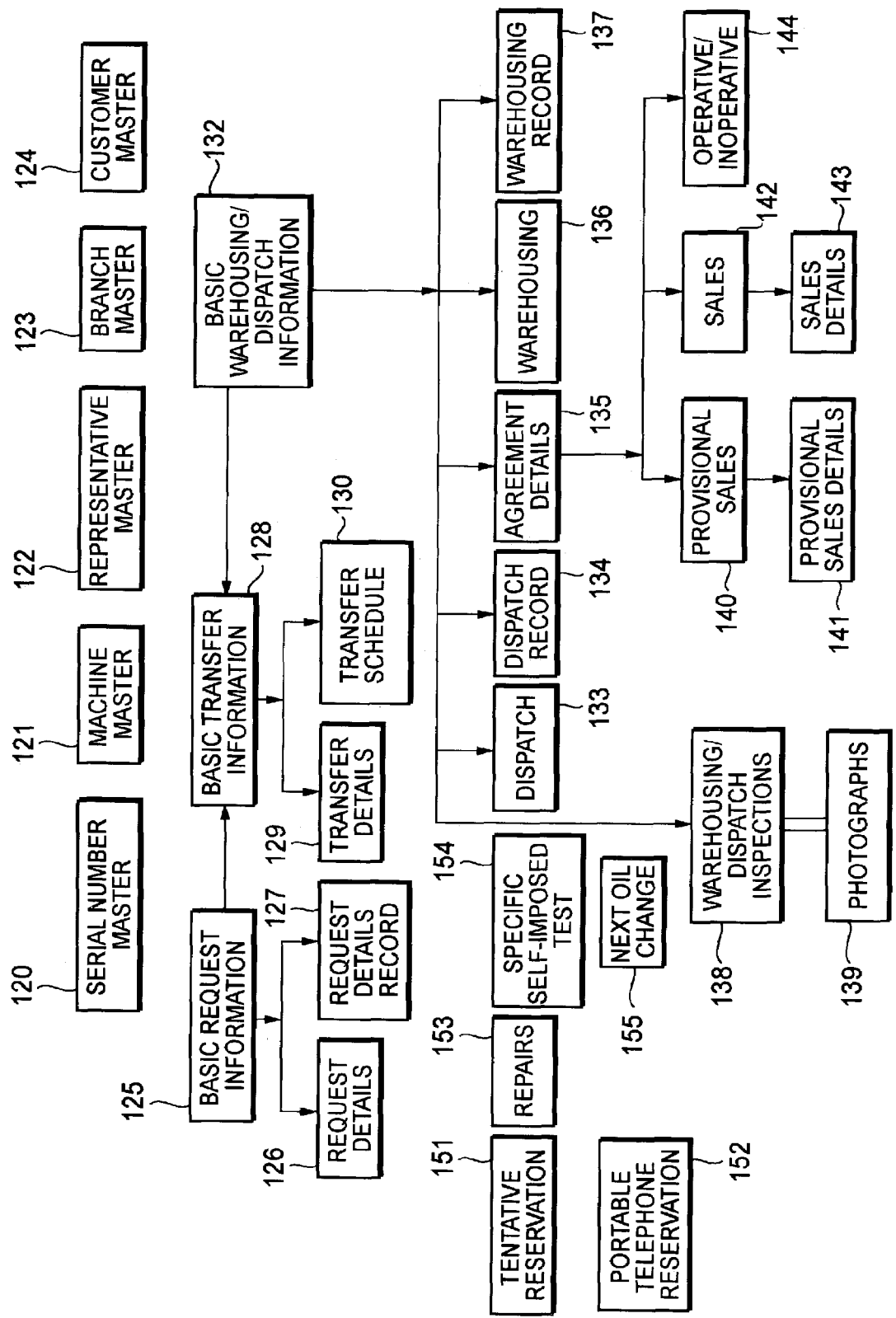
FIG. 2 is a block diagram illustrating the content of a database which is stored in a backbone server 108 of a rental company system 100.

FIG. 2 shows the main content of a database stored in the backbone server 108 of the rental company system 100. The arrows between the tables in FIG. 2 indicate data items that are shared among tables, the data in the table on the root side of the arrow being reflected in the table on the tip end of the arrow. The double lines between the tables indicate that data are linked between tables.

As is illustrated in FIG. 2, this database comprises a serial number master table 120 on which various information concerning the construction vehicles which are for rent is recorded, a machine master table 121 on which information concerning each of the models of the construction vehicles is recorded, a staff master table 122 on which information concerning company employees such as sales representatives is recorded, a branch master table 123 on which information concerning each branch office and the head office is recorded, and a customer master table 124 on which information concerning each customer is recorded.

This database also comprises a basic request information table 125 on which basic information relating to "requests" (acceptance requests issued by a branch office or a sales representative concerning rental inquiries or orders from customers), a request details table 126 on which detailed information concerning requests is recorded, and a record details table 127 on which the content of the request details table 126 concerning completed past requests is saved.

The database also comprises a basic transfer information table 128 on which basic information relating to movement operations of construction vehicles between locations is recorded, a transfer details table 129 on which detailed information concerning movement operations is recorded, and a transfer schedule table 130 on which information relating to moving operation schedules is recorded.

The database also comprises a basic warehousing/dispatch information table 132 on which basic information relating to the procedure for removing a construction vehicle from a warehouse to lease to a customer at the beginning of the rental period (dispatch) and the procedure for returning the construction vehicle to the warehouse from the customer at the end of the rental period (warehousing) is recorded, a dispatch table 133 on which detailed information concerning the dispatch procedure is recorded, a dispatch record table 134 on which the content of the dispatch table 133 concerning completed past rental agreements is saved, a warehousing table 136 on which detailed information concerning the warehousing procedure is recorded, a warehousing record table 137 on which the content of the warehousing table 136 concerning completed past rental agreements is saved, and a warehousing/dispatch inspection table 138 on which information relating to inspections performed on construction vehicles at the time of warehousing or dispatch is recorded. A photograph base 139 on which data for photographs of the construction vehicles taken by a digital camera during a warehousing/dispatch inspection are saved is linked to the warehousing/dispatch inspection table 138.

This database also comprises an agreement details table 135 on which detailed information concerning rental agreements is recorded, a provisional sales table 140 on which information concerning provisional sales is recorded, a provisional sales details table 141 on which detailed information concerning provisional sales is recorded, a sales table 142 on which sales information is recorded, a sales details table 143 on which detailed sales information is recorded, and a vehicle operative/inoperative table 144 on which information relating to operative and inoperative states of construction vehicles is recorded.

This database further comprises a tentative reservation table 151 on which information relating to tentative rental reservations for construction vehicles is recorded, a portable telephone reservation table 152 on which information relating to rental reservations placed by sales representatives using portable telephones is recorded, a repairs table 153 on which information relating to construction vehicle repairs is recorded, a specific self-imposed test table 154 on which information relating to specific self-imposed construction vehicle tests is recorded, and a next oil change table 155 on which information relating to the next oil change of the construction vehicles is recorded.

From among these tables 120 through 155 on which master data are recorded, only those tables which relate directly to the following explanation of work processing will be focussed upon in order to list the data items recorded therein.

1. Serial Number Master Table 120

In this table, the following items are recorded for each of the construction vehicles 101, 101 . . . for rent: an inherent "management number"; a "branch code" and "branch name" of the branch office of the vehicle of this management number; a "model"; an inherent "machine number"; a "specification"; a "model"; a "date of purchase"; an "initial cost"; an "hour meter"; an "hour meter reset date"; a "search keyword"; a "self-imposed test date"; a "self-imposed test implementation deadline"; a "tentative reservation classification" indicating the presence or absence of a tentative reservation; a "repair classification" indicating whether a vehicle is in regular working order or undergoing repairs; a "warehousing inspection classification" indicating whether a vehicle has or has not undergone a warehousing inspection, or if this has yet to be determined; a "warehousing inspection date"; a "reservation restriction flag" indicating the presence or absence of reservation restrictions; a "movement restriction flag" indicating the presence or absence of movement restrictions; and so on.

2. Machine Master Table 121

In this table, the following items are recorded for each model of the construction vehicles for rent: a "machine code", "machine name" and "machine abbreviation" which indicate the model of a vehicle; a "reservation restriction flag" indicating the presence or absence of reservation restrictions; and so on.

3. Basic Request Information Table 125

In this table, the following items are recorded for each request (a rental inquiry or an order request): an inherent "request number"; a "reception date"; a "customer code" and "customer name" for a customer; a "branch code" and "branch name" of the branch office issuing the request and a "representative code" and "representative name" of the sales representative; a "dispatch point code" and "dispatch point name" indicating the branch office from which the vehicle to be rented will be dispatched (the dispatch point); a "request flag" indicating the presence or absence of confirmation that the request has been connected to a received order; a "desired dispatch date" and "desired dispatch time" of a customer; a "dispatch desire classification" indicating whether the desired dispatch time and date are fixed or adjustable; a customer "provisional date of return"; a "provisional return classification" indicating whether the provisional date of return is fixed or adjustable; an "agreement type" indicating whether an agreement is daily, weekly, monthly, etc.; a "period of agreement"; a "provisional order sum" and "provisional order unit price" indicating the provisional rental sum and the provisional unit price; and so on.

4. Request Details Table 126

In this table, the following items are recorded for each request: the "request number", "date of reception", "representative code", and "representative name", copied from the basic request information table 124; the "management number", "model", and "serial number" for the vehicle to be rented; information indicating a "special specification" when a request for a special specification has been made; information indicating each type of specification such as "operating type", "shoe", "suit plate", "suit", and so on; a "substitute possibility" indicating whether or not a substitute model exists; a "substitute model" when a substitute model exists; a "reservation classification" indicating whether the request is still at the request stage, has been abandoned, has been turned down, has been reserved, or whether the vehicle has been dispatched; and so on.

5. Basic Transfer Information Table 128

In this table, the following items are recorded for each branch-to-branch construction vehicle transfer: an inherent "transfer instruction number"; an "instructing branch code", "instructing branch name", "instructing representative code" and "instructing representative name" indicating the branch office from which the transfer instruction was issued and the representative thereof; and when the transfer is in response to a specific request, a "request number" of this request, a "requesting branch code", "requesting branch name", "requesting representative code" and a "requesting representative name" indicating the branch from which the request was issued and the representative thereof, a "customer code" and "customer name" for the request; and so on.

6. Transfer Details Table 129

In this table, the following items are recorded for each branch-to-branch construction vehicle transfer request: the "transfer instruction number" copied from the basic transfer information table 128; a "warehousing/dispatch number" copied from the basic warehousing/dispatch information table 132; a "transfer confirmation flag" indicating whether transfer is complete or not; if there is a corresponding request, the "request number", "management number", "model", and "serial number" of the corresponding request, copied from the request details table 125; a "previous storage point code" and "previous storage point name" for the construction vehicle to be transferred; a "departure point code" indicating the branch office from which the vehicle departs; an "arrival point code" indicating the branch office at which the vehicle arrives; a "place of departure"; a "time of departure"; a "place of arrival"; a "time of arrival"; a "planned transfer time"; a "transportation company name"; a "driver [name]"; a "transfer date"; a "shift to schedule flag" indicating whether or not the process has shifted to the transfer scheduling of the system; and so on.

7. Transfer Scheduling Table 130

In this table, the following items are recorded for each branch-to-branch construction vehicle transfer: the "transfer instruction number" copied from the basic transfer information table 128; the "warehousing/dispatch number" copied from the basic warehousing/dispatch information table 132; a "transfer confirmation flag" indicating whether transfer is completed or not; if there is a corresponding request, the "request number", "management number", "model", and "serial number" of the corresponding request, copied from the request details table 125; a "previous storage point code" and "previous storage point name" for the construction vehicle to be transferred; a "departure point code" indicating the branch office from which the vehicle departs; an "arrival point code" indicating the branch office at which the vehicle arrives; a "place of departure"; a "time of departure"; a "place of arrival"; a "time of arrival"; a "planned transfer time"; a "transportation company name"; a "driver [name]"; a "transfer date"; a "shift to schedule flag" indicating whether or not the process has shifted to the transfer scheduling of the system; and so on.

8. Basic Warehousing/Dispatch Information Table 132

In this table, the following items are recorded for the warehousing/dispatch of each construction vehicle for which a rental agreement has been concluded following a request: the "warehousing/dispatch number" corresponding to the request number copied from the basic request information table 124; the "customer code", "customer name", "branch code", "branch name", "representative code", "representative name", "agreement type", "period of agreement", "provisional order sum" and "provisional order unit price" copied from the corresponding item in the basic request information table 124; the "provisional dispatch date" and "provisional date of return" copied from the basic request information table; and so on.

9. Dispatch Table 133

In this table, the following items are recorded for each construction vehicle dispatch: the "warehousing/dispatch number" copied from the basic warehousing/dispatch information table 132; a "management number" for the construction vehicle and attachments to be dispatched; a "reception date" indicating the date at which the dispatch [order] was inputted; a "dispatch point code" and "dispatch point name" indicating the branch office from which the vehicle is to be dispatched; a "dispatch branch code", "dispatch branch name", "dispatch representative code" and "dispatch representative name" indicating the branch office at which the dispatch order was signed and the representative thereof; the "model" and "serial number" of the construction vehicle to be dispatched; a "dispatch date" indicating the date of dispatch; the "provisional date of return" copied from the basic warehousing/dispatch information table 132; a "site name" indicating the site to which the vehicle is to be rented; a "dispatch time hour meter" indicating the value of the hour meter at the time of dispatch; information indicating various specifications such as "operating type", "shoe", "suit plate", "suit" or the like at the time of dispatch; a "provisional warehousing date classification" indicating whether the provisional warehousing date has been determined or not; and so on.

10. Warehousing Table 136

In this table, the following items are recorded for each construction vehicle warehousing operation: the "warehousing/dispatch number" copied from the basic warehousing/dispatch information table 132; a "management number" for the construction vehicle and attachments to be warehoused; a "reception date" indicating the date at which the warehousing [order] was inputted; a "warehousing point code" and "warehousing point name" indicating the branch office at which the vehicle is to be warehoused; a "warehousing branch code", "warehousing branch name", "warehousing representative code", and "warehousing representative name" indicating the branch office at which the warehousing order was signed and the corresponding representative; the "model" and "serial number" of the construction vehicle to be warehoused; a "warehousing date" indicating the date of warehousing; the "dispatch time hour meter" and the information indicating various specifications such as "operating type", "shoe", "suit plate", "suit" at the time of dispatch, copied from the dispatch table 133; and so on.

11. Warehousing/Dispatch Inspection Table 138

In this table, the following items are recorded for each construction vehicle dispatch inspection and warehousing inspection: the "warehousing/dispatch number" copied from the basic warehousing/dispatch information table 132; a "warehousing/dispatch classification" indicating whether the inspection is a dispatch inspection or a warehousing inspection; an "item ID" for each of the various inspection items; a "result" indicating whether the inspection result for each of the inspection items was positive or negative; a "proceeding" indicating whether each of the inspection items was replaced, repaired, cleaned, oiled, or in working order; a "photograph pointer" indicating data for photographs of the construction vehicle taken during the inspection; and so on.

12. Photograph Base 139

In this base, data for photographs taken respectively during dispatch inspections and warehousing inspections are recorded. Each set of photograph data is linked to the corresponding inspection data in the warehousing/dispatch inspection table 138 by means of the aforementioned "photograph pointer".

13. Tentative Reservation Table 151

In this table, the following items are recorded for each tentative rental reservation: a "management number" for the tentatively reserved vehicle; a "reception date" indicating the date at which the tentative reservation was received; the "customer code" and "customer name" of the customer who placed the tentative reservation; the "branch code", "branch name", "representative code", and "representative name" of the branch office at which the tentative reservation was handled and the representative thereof; and so on.

14. Portable Telephone Reservation Table 152

In this table, the following items are recorded for each reservation placed from a portable telephone: a "management number" of the reserved vehicle; a "reception date" indicating the date at which the reservation was received; the "representative code" of the sales representative who placed the reservation; and so on.

15. Repairs Table 153

In this table, the following items are recorded for each repair operation performed on a construction vehicle: the "management number" of that construction vehicle; a "repair report number", "repair start date", "provisional completion date", "estimated condition", "insurance procedure classification", "condition details", "photograph classification", "requesting branch", and "requesting representative" for the repairs; the "customer code" and "customer name" of the customer who necessitated the repairs; and so on.

16. Specific Self-imposed Test Table 154

In this table, the following items are recorded for each specific self-imposed test performed on a construction vehicle: the "management number" of the construction vehicle; a "date of entry into records"; a "previous test date"; an "hour meter at the time of the specific self-imposed test"; a "specific self-imposed test performing branch code"; an "engine type"; an "engine number"; a "policy number"; a "policy [issuing] branch code"; a "date of policy [issuance]"; "recorded image data"; and so on.

17. Next Oil Change Table 155

In this table, the following items are recorded for the next oil change of a construction vehicle: the "management number", "machine code", "model", "serial number", "hour meter at previous oil change", "date of previous oil change", "provisional hour meter at next oil change", "current hour meter", "reset date of current hour meter", "owning branch code", "owning branch name", "representative code", and "representative name" concerning the construction vehicle in question; and so on.

The flow of the work processing which is conducted in the rental company system 100 using the aforementioned database will be described below.

Figure 3:
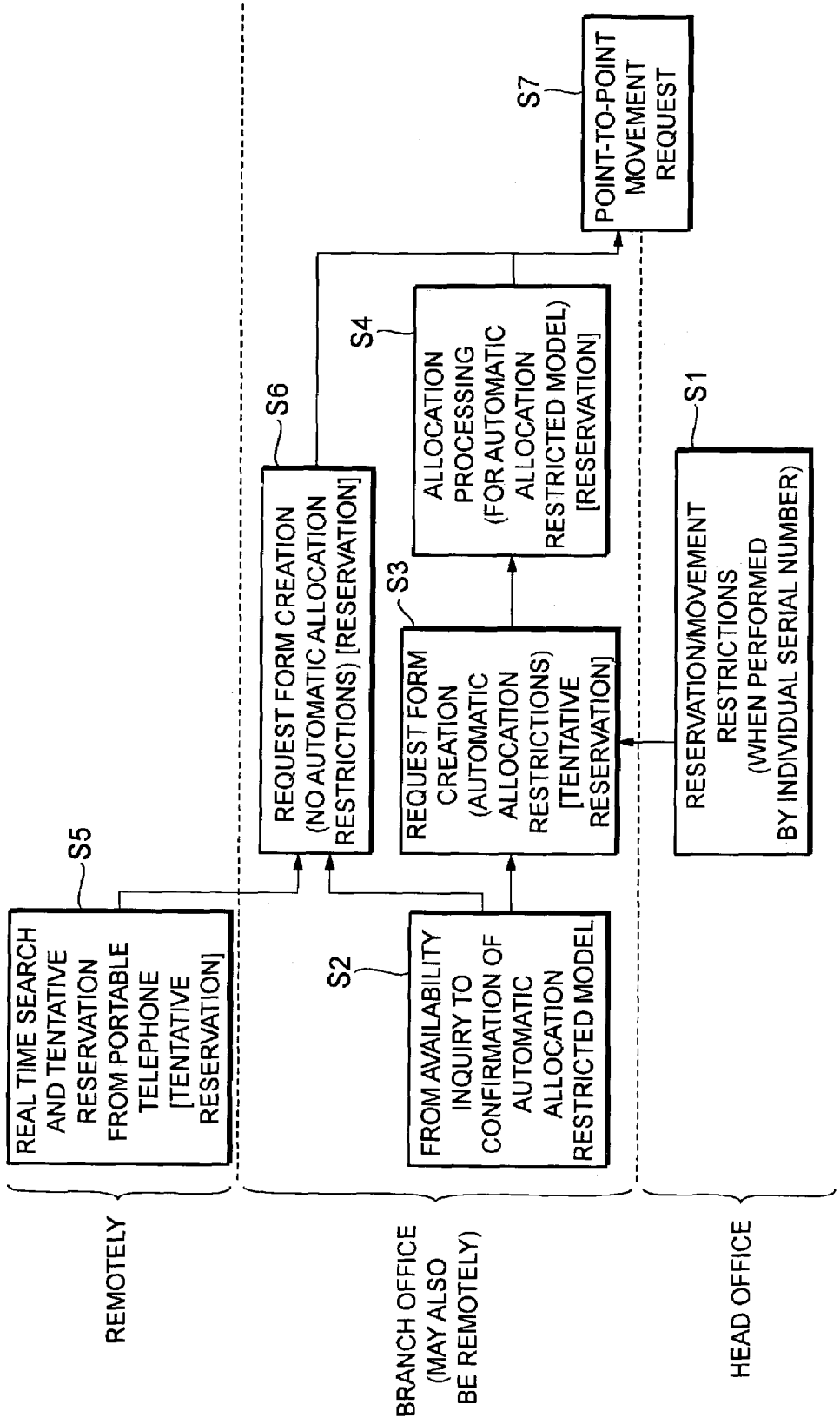
FIG. 3 is a flowchart illustrating the general flow of work processing from an inquiry as to the availability of a construction vehicle to a movement request from among the work processing conducted in this system.
Figure 4:
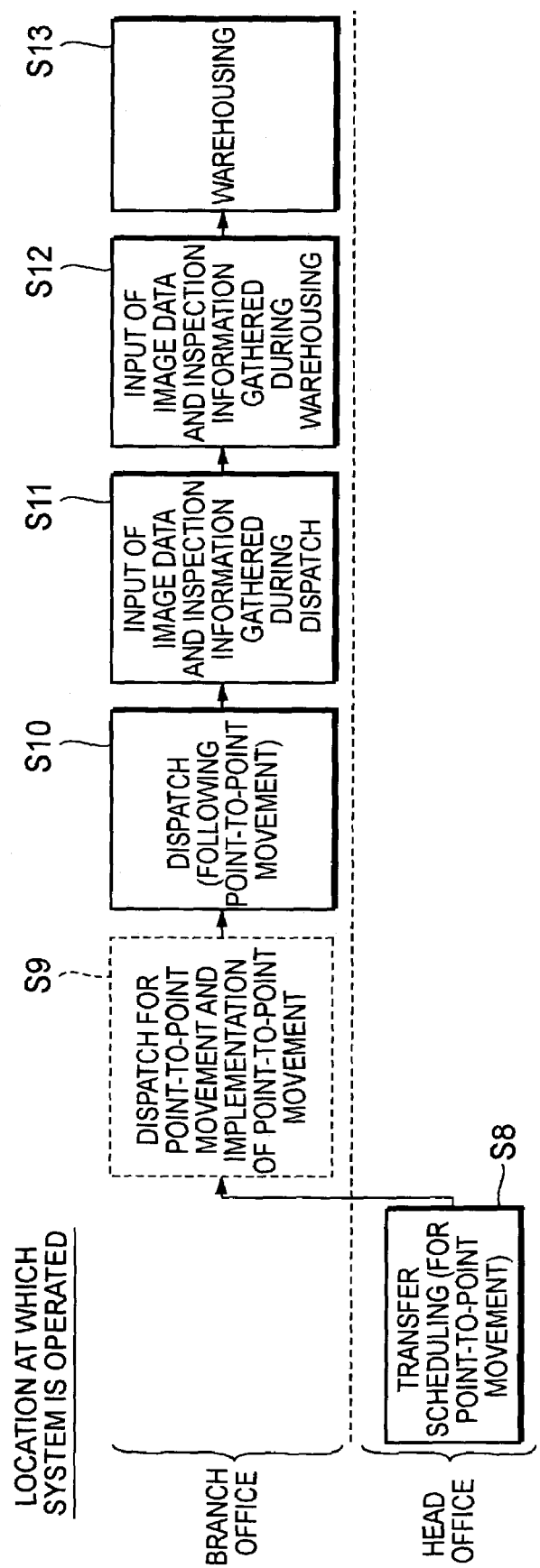
FIG. 4 is a flowchart in continuation of FIG. 3, illustrating the general flow of work processing from construction vehicle transfer scheduling to warehousing.
Figure 5:
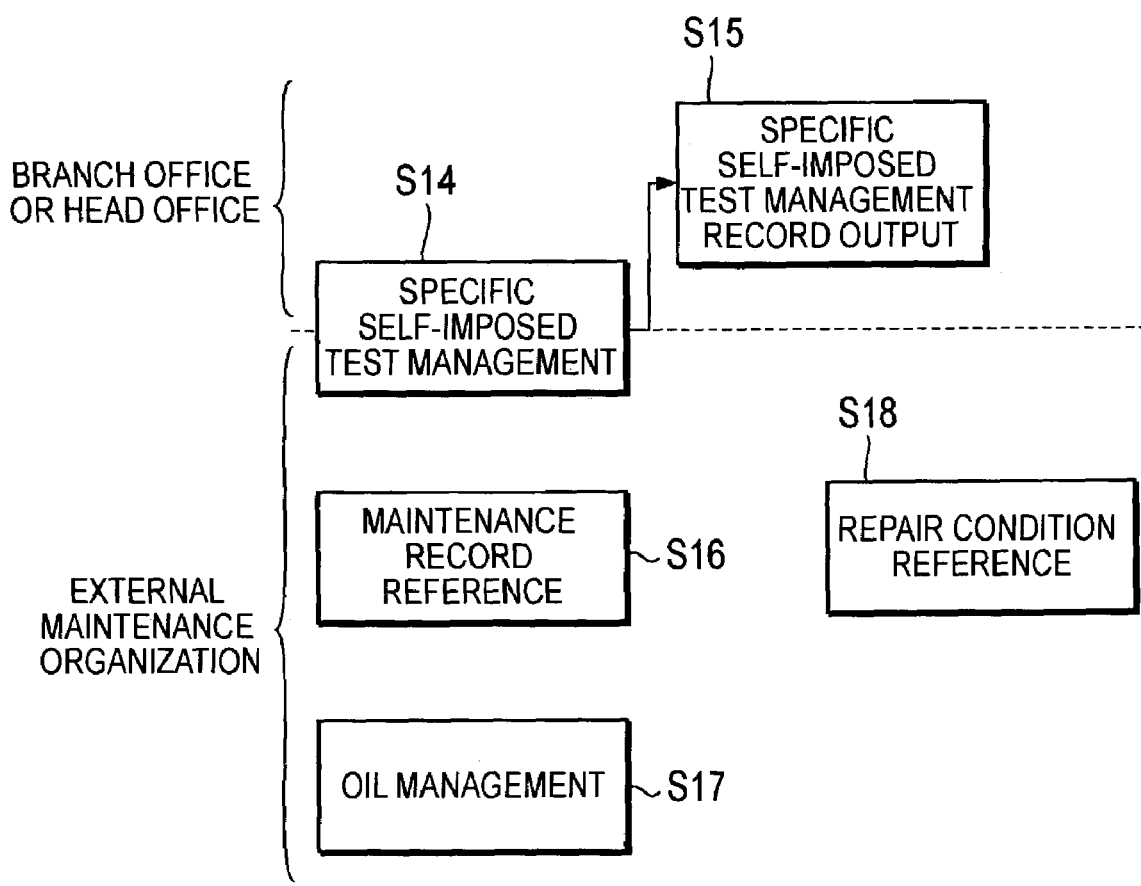
FIG. 5 is a flowchart illustrating the general flow of work processing relating to construction vehicle maintenance.

From the work processing conducted in this system, FIG. 3 illustrates the overall flow of work processing from an inquiry as to the availability of a construction vehicle to a movement request. FIG. 4 continues onward from FIG. 3, illustrating the general flow of work processing from construction vehicle transfer scheduling to warehousing, and FIG. 5 illustrates the general flow of work processing relating to construction vehicle maintenance.

As is illustrated in FIG. 3, reservation/movement restriction processing (step S1) can be performed in the head office at any time. In this processing S1, an arbitrary construction vehicle is specified and reservation restrictions or movement restrictions are placed on that construction vehicle. Alternatively, restrictions can be removed from an arbitrary construction vehicle on which reservation restrictions or movement restrictions are already placed. Here, "reservation restrictions" are a measure taken to prohibit the automatic reservation of a vehicle in response to a request from the portable telephone or the like of a sales representative or the like (that is, a reservation cannot be made unless a branch operator inputs the reservation manually after judging the propriety of the reservation). "Movement restrictions" are a measure taken such that branch-to-branch movement (point-to-point movement) of a vehicle cannot be determined automatically. These reservation restrictions and movement restrictions will be referred to generically as "automatic allocation restrictions".

"Automatic allocation restrictions" are basically a measure taken to prevent the system from automatically allocating a vehicle in response to a rental order (that is, a vehicle cannot be allocated unless a branch operator manually allocates a vehicle after judging the propriety of the allocation). Since these automatic allocation restrictions may be placed on individual vehicles, the operating time and maintenance schedule of each vehicle may be systematically controlled, and thus when a vehicle is placed on the used vehicle market at a predetermined period, the hour meter and the quality of various parts of the vehicle can be ensured to a fixed standard.

As is illustrated in FIG. 3, availability inquiry processing (S2) may be performed as required, for example when a customer inquiry has been placed, at each branch office. In this processing S2, various conditions, such as the availability status, that is whether the vehicle is available, reserved, under repair, and so on, the dispatch point, specifications, whether or not automatic allocation restrictions are in place, and so on, can be confirmed for a vehicle of any type.

Furthermore, a sales representative who is out of the office may conduct real time search and tentative reservation processing (S5) as required, such as when a customer inquiry has been placed to the outside location of this sales representative. In this process S5, a currently available vehicle of an arbitrary model (only vehicles on which automatic allocation restrictions are not in place) may be retrieved and confirmed by connecting a portable telephone to the portable telephone content server of the rental company system, and a tentative reservation may be issued for the specified vehicle on the basis of the results of the retrieval and confirmation.

Request form creation processing (S3, S6) may be performed in a branch office when an inquiry or an order has been placed from a customer. For vehicles which are confirmed as having automatic allocation restrictions in place as a result of the aforementioned availability inquiry (S2), request form creation processing for automatic allocation restricted models (S3) is performed following regular confirmation. For vehicles which are confirmed as having no automatic allocation restrictions in place as a result of the aforementioned availability inquiry (S2), request form creation processing for models without automatic allocation restrictions (S6) is performed. Request form creation processing for models without automatic allocation restrictions (S6) is also performed for vehicles (without automatic allocation restrictions) which have been tentatively reserved according to the aforementioned real time search and tentative reservation processing (S5) by means of portable telephone.

Next, allocation processing (S4) is performed in the branch office in respect of vehicles, which have undergone request form creation processing for automatic allocation restricted models (S3) By means of this allocation processing (S4), a reservation is confirmed for the automatic allocation restricted vehicle. As for vehicles with no automatic allocation restrictions, reservations are confirmed at the stage of the request form creation processing for models with no automatic allocation restrictions (S6).

Point-to-point movement request processing (S7) is then performed in the branch office or head office for reservation-confirmed vehicles. In this processing S7, a general outline of the transfer means, possible transfer dates and so on is decided in respect of each point-to-point vehicle movement operation (the transfer of a currently warehoused vehicle to a customer).

Next, as is illustrated in FIG. 4, transfer scheduling processing (S8) is performed at head office in respect of vehicles for which point-to-point movement request processing (S7) is complete. In this processing S8, a fixed transfer schedule is determined for each vehicle.

Next, actual vehicle dispatch, dispatch inspection, and point-to-point movement are implemented at the branch office in accordance with the determined transfer schedule (S9), while dispatch processing (S10), dispatch image data processing and inspection information input processing (S11) are performed simultaneously.

A warehousing inspection is performed at the branch office when a vehicle is returned from a customer at the end of the rental period, while warehousing image data processing and inspection information input processing (S12) and warehousing processing (S13) are performed simultaneously.

As is illustrated in FIG. 5, specific self-imposed test management processing (S14) is performed periodically or as required in a branch office or the head office of the rental company, or at an external maintenance organization. In this processing S14, a construction vehicle which is to be subject to a specific self-imposed test is specified, and a specific self-imposed test management record is created by entering the results of the specific self-imposed test performed on this vehicle. Specific self-imposed test management record output processing (S15) is then performed in the branch office, and the outputted (printed) specific self-imposed test management record is stored.

Maintenance record reference processing (S16), oil management processing (S17), repair condition reference[iv] (S18) and so on are also performed in the external maintenance organization periodically or as required. Thereby, the vehicles are managed such that maintenance, oil changes, and repairs are performed appropriately.

A general explanation of the rental system was given above. In this rental system, the operators of the terminal computers 112 in the branch offices (to be referred to as "branch operators" below) respond to customer inquiries in the manner described hereinbelow. The parts of this embodiment which relate directly to the present invention will be described below with reference to FIG. 6 onward.

Figure 6:
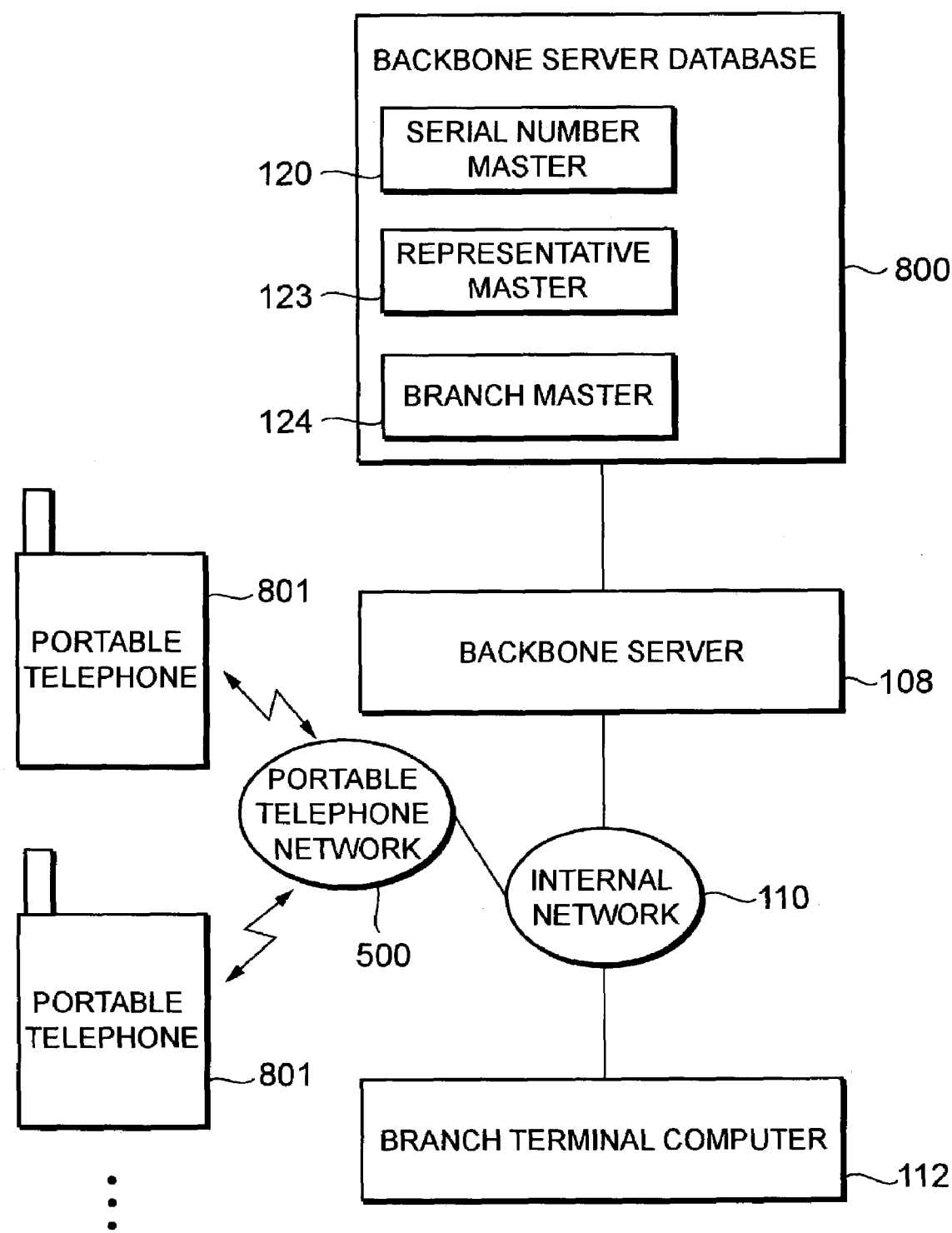
FIG. 6 is a block diagram illustrating the parts of the rental system shown in FIG. 1 which directly relate to the present invention.

FIG. 6 is a block diagram illustrating the parts of the rental system shown in FIG. 1 which relate directly to the present invention.

In this embodiment, as is illustrated in the drawing, the branch terminal computers (to be referred to as "branch terminals" below) 112, the internal network 110, a portable telephone network 500, the backbone server 108, the serial number master table 120, branch master table 124, and representative master table 123 in the database 800 of the backbone server 108, and portable telephones 801, 801 . . . carried by branch personnel are used in accordance with the operations of a branch operator when a customer inquiry has been placed with a branch office.

The flow of the procedure following the reception of a customer inquiry by a branch operator will now be described with reference to FIG. 6 and to each of the screens illustrated in FIG. 7 onward.

Figure 7:
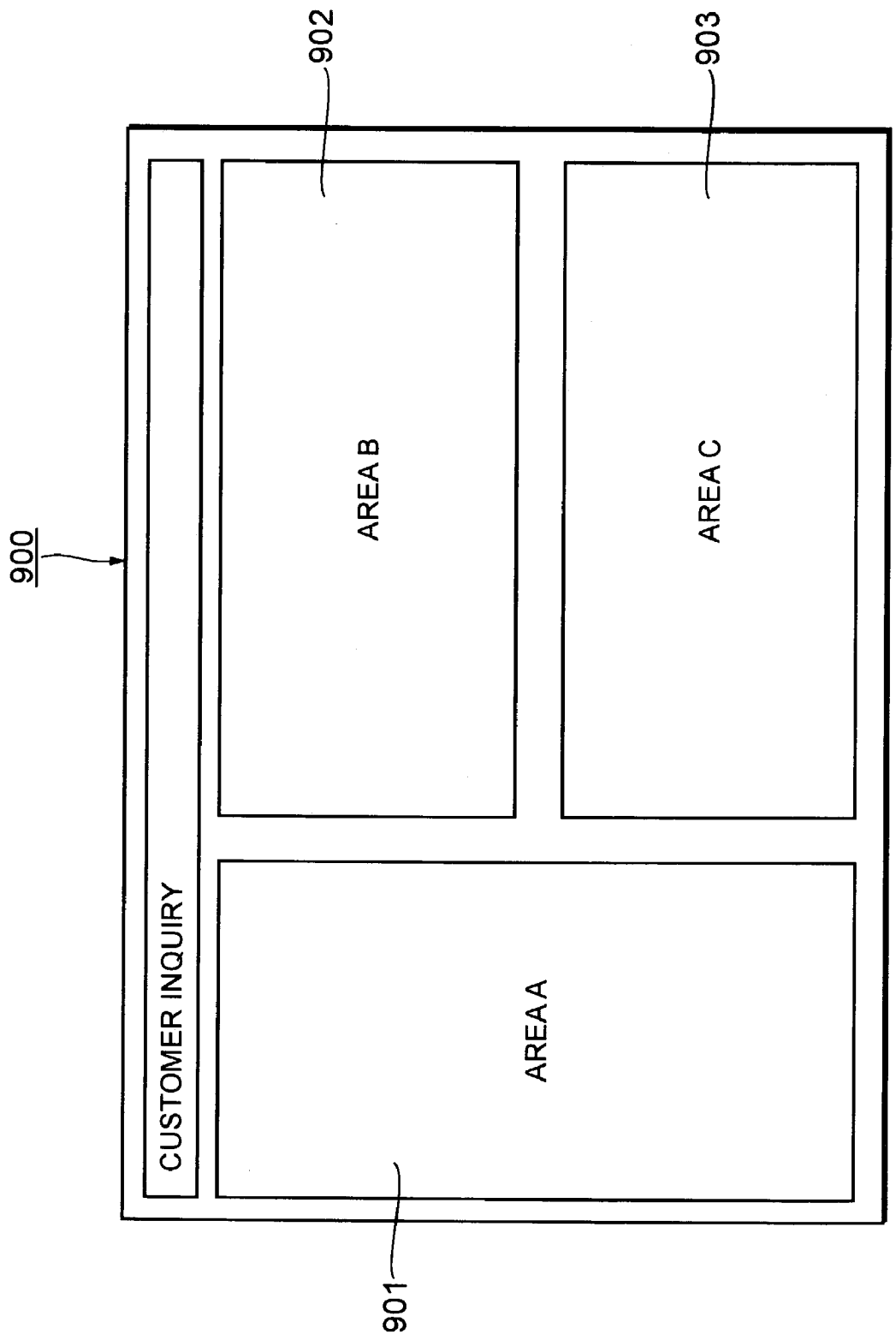
FIG. 7 is a view showing an example of a "Customer Inquiry" screen.

The branch operator performs a predetermined operation after receiving a customer inquiry to cause the backbone server 108 to display a "customer inquiry" screen 900 shown in FIG. 7 on the branch terminal 112 (this screen may be displayed at all times). The customer inquiry screen 900 is divided into three display areas 901, 902, 903. A "machine conditions inquiry" screen 901 shown in FIG. 8, an "inquiry list" screen 906 shown in FIG. 10, and a "reception registration and modification" screen 907 shown in FIG. 11 are displayed in the display area 901, the display area 902, and the display area 907 respectively (the size of each of the screens 904, 906, 907 may be adjusted by a specific operation such as dragging the mouse).

The machine conditions inquiry screen 904 shown in FIG. 8 is a user interface screen for inquiring as to the conditions of a branch-owned construction vehicle (upon display, all of the entry fields are blank). In accordance with communication with a customer, the branch operator inputs the machine code (for example PC120) of the model which is subject to inquiry or the management number of the vehicle which is subject to inquiry into the machine conditions inquiry screen 904 as a search key. The backbone server 108 then extracts all of the vehicle records corresponding to the inputted search key from the serial number master table 120 and displays the content of these records as a list 905 on the machine conditions inquiry screen 904, as is illustrated in FIG. 8. The displayed list 905 (records content) includes the availability status (whether a vehicle is available, reserved, tentatively reserved, under repair, or on dispatch), whether or not automatic allocation restrictions are in place (indicated in the example in FIG. 8 by the color of the "Availability" display symbol), the management number, specifications, the dispatch point, and so on. Thus, when the customer requests availability confirmation or wishes to make a reservation during the aforementioned communication, the branch operator is able to check the availability status or presence of automatic allocation restrictions on the desired vehicle while communicating with the customer and inform the customer of the results of this check. Note that it is possible to extend the display range of the list 905 displayed on the machine conditions inquiry screen as is illustrated in FIG. 9 by performing a specific operation (that is, so that more categories of information can be seen on one screen).

The inquiry content information (information showing the content of communication with a customer during a customer inquiry) which is registered in the branch master table 124 according to the process to be described below is displayed as a list on the inquiry list screen 906 shown in FIG. 10 by the backbone server 108. The listed inquiry content information includes, for example, the name of the branch which received the inquiry, the name of the representative who received the inquiry, the customer code and customer name of the inquiring customer, the machine code of the vehicle about which the inquiry was made, the content of the received order, the ordering means, and details of the inquiry (for example an inquiry into availability, an inquiry into price, or an inquiry into usage) Note that by a predetermined operation on the inquiry list screen 906, the inquiry content information may be displayed according to the desired item (for example by branch, by region, by customer, or by representative), or rearranged into a desired sequence (for example chronologically or in order of branch). Further, by selecting a desired piece of inquiry content information on the screen 906 (for example aligning the mouse cursor and double-clicking), the screen 907 shown in FIG. 11 can be displayed, whereby this screen 907 can be used to modify this inquiry content information.

The reception registration and modification screen 907 shown in FIG. 11 is used for inputting the content of an inquiry according to a plurality of predetermined items (upon display, all entry fields apart from specific items (such as reception date and so on) are blank). This reception registration and modification screen 907 includes, as shown in the drawing for example, "customer code", "customer name" (which will be referred to hereafter generically as "customer information"), "reception date", "reception", "inquiry details" (detailed content of the inquiry such as "inquiry into availability", "inquiry into price", "inquiry into specification"), "content of the received order", "ordering means", and so on.

The aforementioned various items of inquiry content information may be directly inputted into this screen 907 by a manual operation (input by means of a keyboard operation), or may be inputted using various tools 920 through 926. More specifically, by clicking a "search" button 921 when inputting customer information, a customer screen (not shown) is displayed by the backbone server 108. Customer information can be inputted using this customer screen by inputting a desired search key on the screen. Further, by clicking pull-down buttons 922 through 926 when inputting "inquiry details" or "received order" and selecting a desired menu from the pull-down menus displayed as a result, "inquiry details" or "received order" can be inputted. In the case of an inquiry into availability, the displayed pull-down menu includes the detailed content of an inquiry into availability, for example the received order, response at the branch in question, response at another branch, double rental (the vehicle is unavailable and is therefore rented from another branch, after which the order is responded to), and response impossible. In the case of an inquiry into price, details regarding an inquiry into price, for example discount agreement, reserved discount agreement, discount refusal, and head office cleared may be included. In the case of order, details regarding an order, for example new order, order requested, order expected, follow-up necessary, order impossible, and soon, are included.

When the inquiry content information has been inputted into the entry fields in the reception registration and modification screen 907 corresponding to each of the predetermined items described above using the various tools 920 through 926 or by means of a direct manual input operation, the branch operator registers the inquiry content information inputted into the reception registration and modification screen 907, along with the branch information installed in the branch terminal 112 that the branch operator is currently using, in the branch master table 124 via the internal network 110 and the backbone server 108 by clicking an "enter" button 915. A similar operation is performed at each of the branches, and thus the content of the inquiries received at each branch is registered in the branch master table 124 and managed unitarily in the rental company system 100. The content which is registered in the branch master table 124 is displayed on the inquiry list screen 906 of FIG. 10 as described above. Therefore, if an inquiry is placed from a customer who had an inquiry dealt with by a representative the previous day, and if that representative is unavailable, the content of the inquiry received by the representative the previous day can be learned by looking at the inquiry list screen 906, and thus a person other than the representative is able to communicate with the customer. Needless to say, head office staff as well as branch office staff may also view the inquiry list screen 906. By looking at the content of inquiries at each of the branch offices, head office staff are able to learn the amounts of the various types of inquiries, the popularity of vehicles, and so on, and as a result, business efficiency can be improved.

When the branch operator clicks a "reception list" button 913 on the reception registration and modification screen 907, a screen (not shown) is displayed by the backbone server 108, and if a specific operation is performed on this screen, the inquiry content information displayed on the inquiry list screen 906 in FIG. 10 can be listed by desired item (for example by branch, by region, by customer, or by representative), or rearranged into a desired sequence (for example chronologically or in order of branch).

If the branch operator clicks a "register" button 914 on the reception registration and modification screen 907, the backbone server 108 transmits to and displays on the branch terminal 112 an "inquiry information transfer" screen 980, which is illustrated in FIG. 12. The inquiry information transfer screen 980 is used to instruct the system to transfer the inquiry content information inputted into the reception registration and modification screen 907 to the portable telephone 801 of a desired representative (needless to say, the terminal to which this information is transferred need not be a portable telephone 801, but since the representative will be swiftly and securely informed of the inquiry content information in this manner even when outside, the portable telephone 801 is preferable).

By clicking a pull-down button 981 in a transmission destination dialog box 982, the branch operator selects the desired representative from a representative list (a list (not shown) displaying the names and portable telephone electronic mail addresses of representatives extracted by the backbone server 108 from the representative master table 123) which is displayed as a pull-down menu on the inquiry information transfer screen 980. The representative code and name of this representative ("0001 Taro Kimura" in the example in the drawing) is then automatically inputted into the transmission destination dialog box 982, and the portable telephone electronic mail address (taro@abc.ne.jp in the example in the drawing) of the representative is inputted into the address input row 983. The branch operator confirms the representative which has been inputted as the transmission destination, and then clicks a "send" button 984. The inquiry content information inputted into the reception registration and modification screen 907 shown in FIG. 11 is thus transferred to the portable telephone 801 of the desired representative through the portable telephone network 500. Note that the electronic mail address of the desired transmission destination (representative) may be inputted directly by means of a keyboard operation.

According to this embodiment as described above, information relating to inquiries received at a branch office (inquiry content information) is inputted into the reception registration and modification screen 907 and thereby registered in the branch master table 124 through the internal network 110. Since a similar operation is performed at all of the branch offices, [this information] is managed unitarily in the rental company system 100. As a result, the amount of each type of inquiry, the popularity of a vehicle, and so on, may be learned by viewing the inquiry content of each branch. In other words, the pre-ordering process and lost sales information can be understood, and hence business efficiency can be improved.

Furthermore, according to the aforementioned embodiment, the inputted inquiry content information can be transferred immediately to a desired receiver using the inquiry content information transfer screen 980 shown in FIG. 12. In other words, a desired party may be informed of the inquiry content in a precise and timely fashion.

The embodiment of the present invention described above is merely an exemplification of the present invention, and does not imply that the present invention is limited to this embodiment. Accordingly, the present invention maybe implemented in various other embodiments. That is, the present invention is capable of managing and notifying the results of communication conducted with a customer regardless of the method of communication, be it telephone, electronic mail, FAX, or another method.

What is claimed is:

1. A system for managing the results of communication over a telephone with a customer regarding construction vehicle rentals, comprising:
   a plurality of computer terminals disposed in a plurality of branches;
   a server is connected to the plurality of computer terminals and accesses a database in response to request from at least one of the plurality of computer terminals;
   the server comprising:
   means for displaying a customer inquiry screen which displays a communication support screen in a first display area, a communication results list screen in a second area, and a communication results input screen in a third display area, in a computer terminal among the plurality of computer terminals in response to perform a predetermined operate to the computer terminal, wherein the communication support screen is a screen for supporting the communication with said customer, the communication results list screen is a screen on which stored customer information and communication results in said database are displayed as a list divided into a plurality of items, and the communication results input screen is a screen used for inputting the results of communication with a customer and information relating to said customer;
   means for receiving designation of a previous communication result and customer information selected by a branch operator among a plurality of previous communication results and customer information being displayed in said communication results list screen;
   means for displaying the previous communication result and customer information selected by the branch operator in said communication results input screen;
   means for searching said database for information denoting an availability status and presence of an automatic allocation restriction which correspond to a retrieval key regarding construction vehicles inputted by said branch operator while communicating with the customer over the telephone, and displaying said information in said communication support screen;
   means for storing present customer information and communication results which are updated previous customer information and communication result by the branch operator on said communication results input screen; and
   means for allocating a construction vehicle which is not confirmed as having the automatic allocation restriction in response to request from anyone other than a branch operator, and not allocating a construction vehicle which is confirmed as having the automatic allocation restriction in response to request from anyone other than a branch operator but allocating it in response to manually operate by a branch operator, wherein the automatic allocation restriction is a restriction that means a construction vehicle cannot be allocated unless a branch operator manually allocates a construction vehicle.

2. A method for managing the results of communication over a telephone with a customer regarding construction vehicle rentals, comprising the steps of:
   displaying a customer inquiry screen which displays a communication support screen in a first display area, a communication results list screen in a second area, and a communication results input screen in a third display area, in a computer terminal among a plurality of computer terminals in response to perform a predetermined operate to the computer terminal, wherein the communication support screen is a screen for supporting the communication with said customer, the communication results list screen is a screen on which stored customer information and communication results in a database are displayed as a list divided into a plurality of items, and the communication results input screen is a screen used for inputting the results of communication with a customer and information relating to said customer, the database can be accessed from the plurality of computer terminals;
   receiving designation of a previous communication result and customer information selected by a branch operator among a plurality of previous communication results and customer information being displayed in said communication results list screen;
   displaying the previous communication result and customer information selected by the branch operator in said communication results input screen;
   searching said database for information denoting an availability status and presence of an automatic allocation restriction which correspond to a retrieval key regarding construction vehicles inputted by said branch operator while communicating with the customer over the telephone, and displaying said information in said communication support screen;
   storing present customer information and communication result which are updated previous customer information and communication result by the branch operator on said communication results input screen;
   allocating a construction vehicle which is not confirmed as having the automatic allocation restriction in response to request from anyone other than a branch operator; and not allocating a construction vehicle which is confirmed as having the automatic allocation restriction in response to request from anyone other than a branch operator but allocating it in response to manually operate by a branch operator,
wherein the automatic allocation restriction is a restriction that means a construction vehicle cannot be allocated unless a branch operator manually allocates a construction vehicle.

* * * * *